ATTORNEY

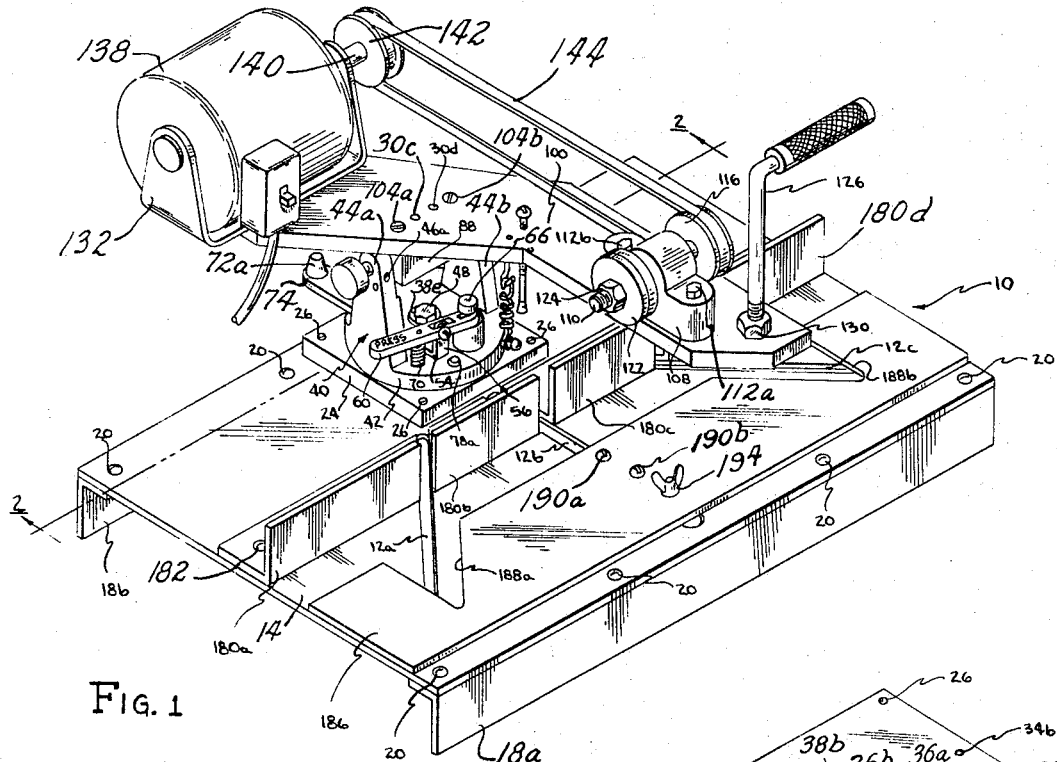
Fig. 1
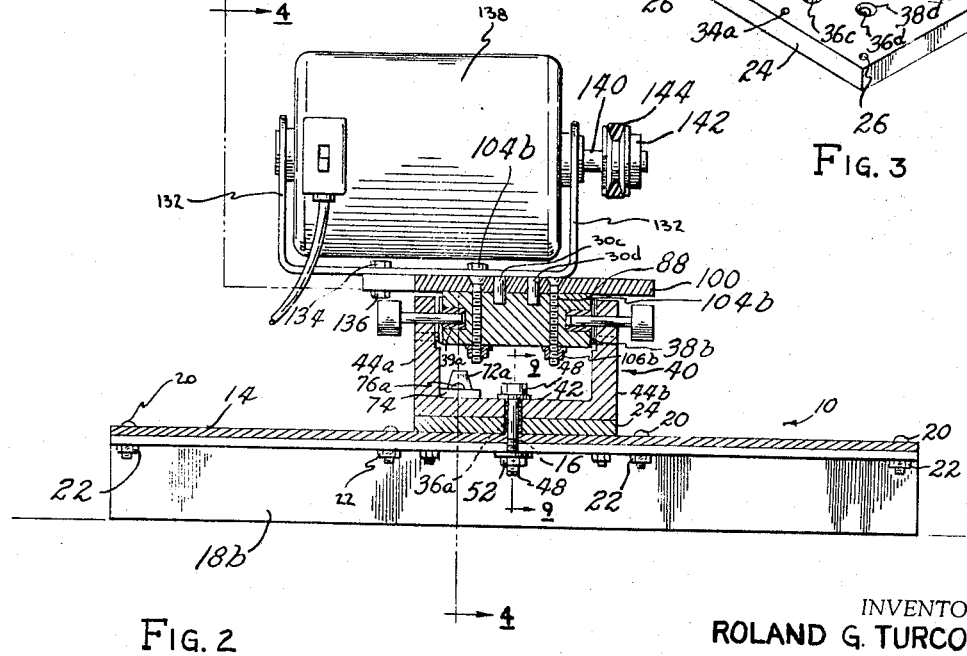
Fig. 2
Fig. 3
INVENTOR.
ROLAND G. TURCOTTE
BY Edward R. Grant
ATTORNEY June 27, 1967  R. G. TURCOTTE  3,327,742
POWER SAW
Filed Jan. 19, 1965  3 Sheets-Sheet 2
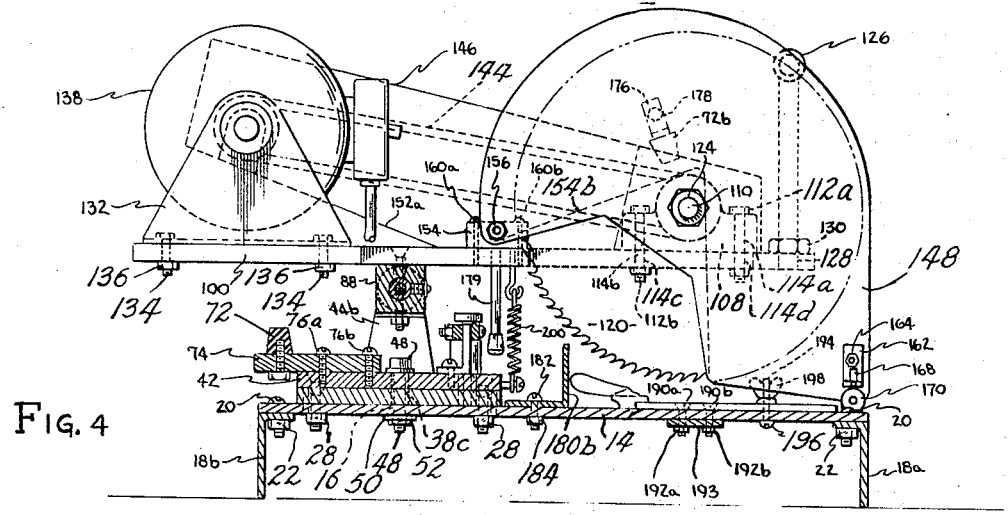
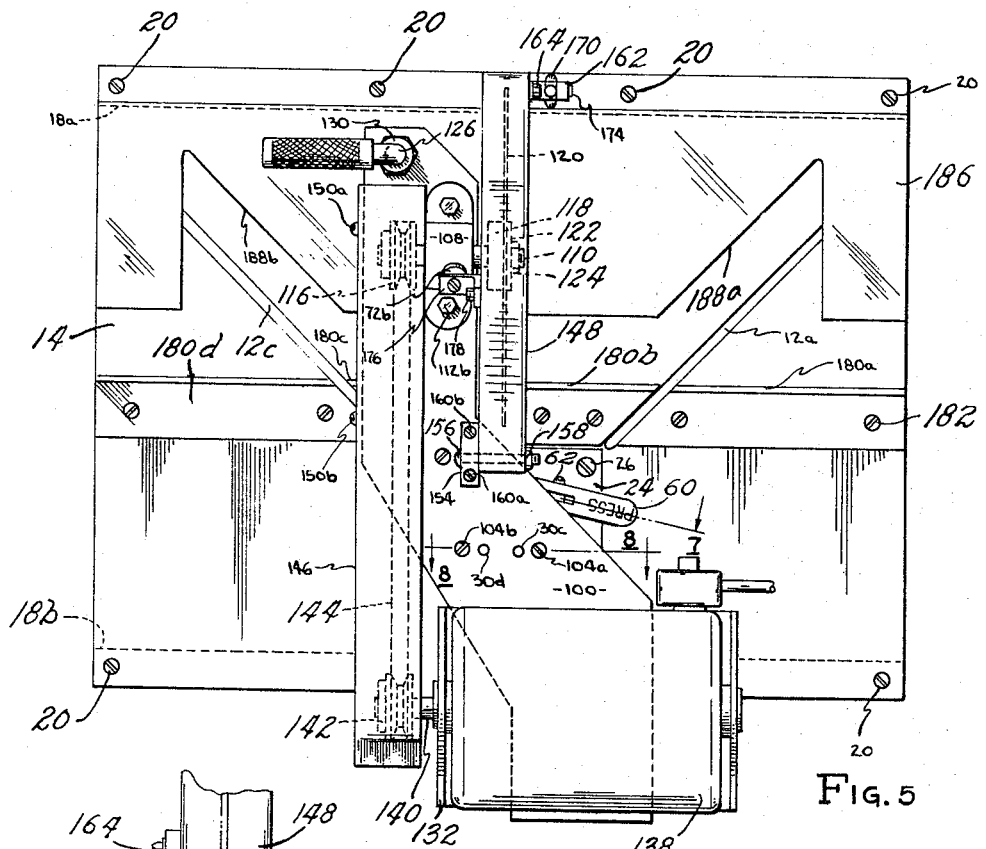
INVENTOR.
ROLAND G. TURCOTTE
BY Edward R. Grant
ATTORNEY INVENTOR.
ROLAND G. TURCOTTE
BY Edward R. Grant

United States Patent Office 3,327,742
Patented June 27, 1967

3,327,742
POWER SAW
Roland G. Turcotte, 7902 Lena Ave.,
Canoga Park, Calif. 91304
Filed Jan. 19, 1965, Ser. No. 426,541
9 Claims. (Cl. 143—46)

This invention relates to a power saw and more particularly to an improved power saw of the type including a cutting blade and interconnected drive means mounted on a support arm which is swiveled to the worktable so as to be rotatable both horizontally and vertically with respect thereto.

Although power saws of the type hereinafter referred to as pivotal-arm saws have been known for many years, available saws of such design have been found unsatisfactory with respect to some of their features of construction and manner of operation. For example, many pivotal-arm saws known in the are are unnecessarily complicated in structural design, which not only makes their initial cost high but also increases the expenses of replacing worn-out components with substitution parts. Furthermore, it has been found difficult to replace some components in conventional pivotal-arm saws without changing the alignment of the cutting blade, thus adversely affecting the ability of the saw to cut precise angles in workpieces, which may be of primary importance in the utility of the saw, as for example, when picture frame molding is being mitered. In some instances known pivotal-arm saws have also been found inadequate with respect to the depth of cut that can be made in workpieces, the precision with which particular workpieces such as picture frame molding can be positioned upon the worktable of the saw, and the type of safety guards employed to protect a user from contract with the cutting blade and drive means of the saw.

It is therefore a broad object of this invention to provide a pivotal-arm power saw that is durable and efficient yet uncomplicated in structural design and light in weight. In accordance with principles of the invention, this object is achieved by a preferred embodiment comprising: a worktable having a plurality of slots formed therein at various cutting angles; a workpiece fence fixedly mounted on said worktable; a workpiece positioner slidably mounted on said worktable so that it can be variably spaced from said workpiece fence and maintained parallel thereto; a swivel support plate fixedly mounted on said worktable and aligned with respect thereto by means of alignment pins; a swivel pivot centrally mounted on said swivel support plate; a swivel rotatably mounted on said swivel pivot, said swivel including a pair of oppositely disposed arms upstanding from its base; means for locking said swivel in selected angular position on said swivel support plate; a support bar pivoted between the arms of the swivel so as to be rotatable about an axis parallel to the surface of said worktable, said axis intersecting the axis of said swivel pivot; a support arm fixedly mounted on said support bar, said support arm being aligned on said support bar by means of alignment pins and having overhanging end portions that are offset from each other and a central portion that is disposed obliquely to said end portions; a cutting blade rotatably mounted on one end of said support arm; a drive motor fixedly mounted on the other end of said support arm; drive means operably connecting said cutting blade and drive motor; safety guards mounted on said support arm for shielding said cutting blade and drive means respectively; and a handle mounted on said support arm adjacent said cutting blade.

It is an additional object of this invention to provide a pivotal-arm power saw having improved means for positioning workpieces to be cut on the worktable of the saw.

It is a further object of this invention to provide a pivotal-arm power saw having components which can be replaced at relatively low cost by unskilled persons.

It is another object of this invention to provide a pivotal-arm power saw having components which can be replaced without adversely affecting the cutting alignment of the saw.

It is still another object of this invention to provide a pivotal-arm power saw which is compact yet capable of cutting relatively wide stock.

Other objects and advantages of this invention will become apparent as the invention is disclosed in the following description, taken in conjunction with the accompanying drawings, in which:

FIG. 1 is a pictorial view of a pivotal-arm power saw constituting a preferred embodiment of this invention, with the cutting blade and safety guards thereof removed for clarity;

FIG. 2 is a section of the embodiment of the invention illustrated in FIG. 1, taken along line 2—2 of that figure;

FIG. 3 is a perspective view of the swivel support plate of the embodiment of the invention illustrated in FIG. 1;

FIG. 4 is a section of the embodiment of the invention illustrated in FIG. 1, taken along line 4—4 of FIG. 2;

FIG. 5 is a plan view of the embodiment of the invention illustrated in FIG. 1; and FIGS. 6, 7, 8 and 9 are detail views of components of the embodiment of the invention illustrated in FIG. 1.

In the drawings like reference numerals designate like or corresponding parts.

Figure 9:
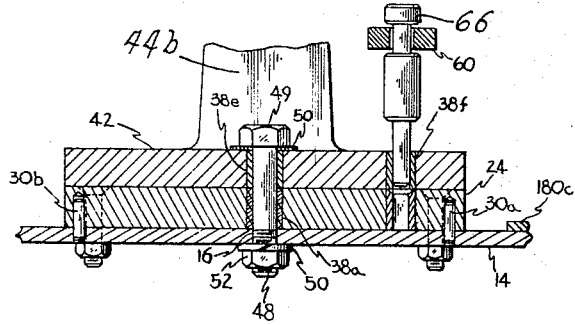

The general arrangement of a pivotal-arm saw constructed in accordance with principles of this invention is illustrated in FIG. 1 in which drawing the numeral 10 generally designates a worktable having three slots 12a, 12b, 12c formed in the top plate 14 thereof. The longitudinal axis of each slot (i.e., a line intermediate the side edges of the slot and parallel thereto) would, if extended, intersect the center of a hole 16 (not shown in FIG. 1 but shown in FIGS. 2 and 4) located at the rear portion of top plate 14 intermediate the side edges thereof. The angle between the longitudinal axes of adjacent slots is 45 degrees, with the longitudinal axis of the central slot being disposed parallel to the side edges of top plate 14. Support members 18a, 18b, formed of conventional L-shaped structural bars, are respectively attached to the front and rear edges of top plate 14 by means of machine screws 20 which extend through holes in said top plate and through mating holes in said support members, and which are provided with nuts 22 (not shown in FIG. 1 but shown in FIG. 2) at their projecting lower ends.

Figure 7:
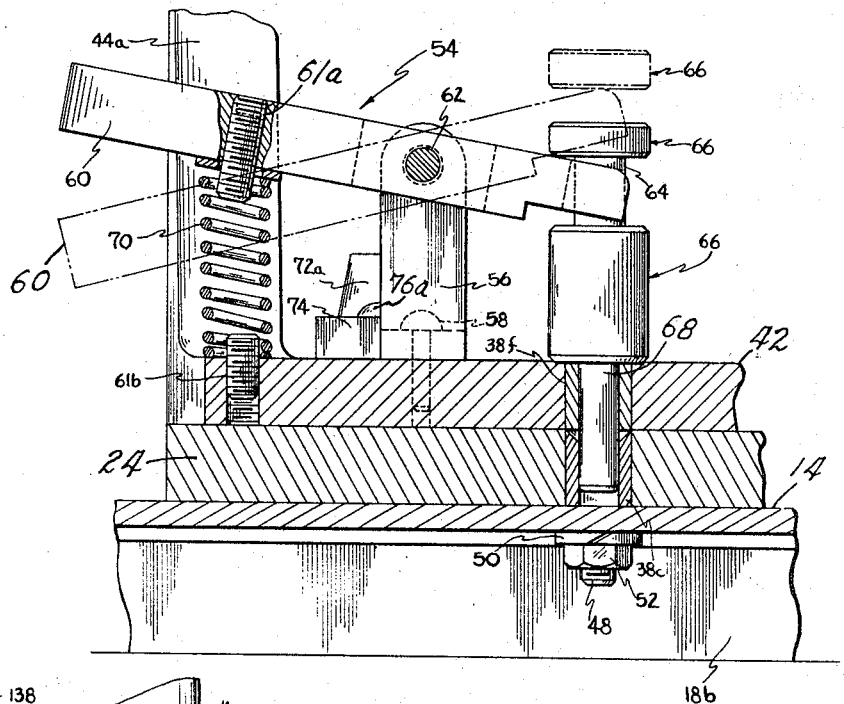

A swivel support plate 24 is fixedly mounted on top plate 14 by means of four machine screws 26 (only three of which can be seen in FIG. 1) which extend through holes respectively formed in said swivel support plate adjacent the corners thereof and through mating holes in said top plate, and which are provided with nuts 28 (not shown in FIG. 1 but shown in FIG. 2) at their projecting lower ends. As illustrated in the drawing, the swivel support plate 24 is positioned at the rear portion of top plate 14 and intermediate its side edges. As can be seen in FIG. 9, a pair of alignment pins 30a, 30b are respectively fixedly positioned, as by a forced fit, within holes in top plate 14. The alignment pins project above the upper surface of top plate 14 and are respectively positioned within holes 34a, 34b (which can also be seen in FIG. 3) formed in swivel support plate 24, said holes having such diameter that the alignment pins fit snugly but removably therein. The swivel support plate 24 is also provided with a hole 36a (the top edge of which can be seen in FIG. 3) which is centrally located therein and which is in axial alignment with the hole 16 in top plate 14 when the swivel support plate is held in its proper position on said top plate by means of the alignment pins 30a, 30b. As can best be seen in FIG. 9, a bushing 38a is disposed within the hole 36a in swivel support plate 24. Again in reference to FIG. 3, the swivel support plate 24 also includes three holes 36b, 36c, 36d each of which is also provided with a bushing 38b, 38c, 38d of the same size as bushing 38a. In FIG. 7, in which a typical bushing 38c is illustrated in section, it can be seen that the inside, upper edge of each bushing 38b, 38c, 38d is chamfered. The holes 36b, 36c, 36d are located in swivel support plate 24 equidistant from hole 36a. A line which intersects the axis of hole 36a and the axis of hole 36c is substantially parallel to the side edges of the swivel support plate 24 and is disposed at an angle of 45 degrees from both a line which intersects the axis of hole 36a and the axis of hole 36b and a line which intersects the axis of hole 36a and the axis of hole 36d.

Again with reference to FIG. 1, a swivel, generally designated by numeral 40 and having a disk-shaped base 42, is positioned upon swivel support plate 24. The swivel 40 includes a pair of oppositely disposed arms 44a, 44b upstanding from its base 42 and integral therewith. As can be seen in FIG. 9, a centrally-located hole extends vertically through the base of the swivel 40, and a bushing 38e is disposed within this hole. A hole 46a, 46b, illustrated by dotted lines in FIG. 8, extends through the upper portion of each arm 44a, 44b, the axes of these holes being coincident and parallel to the lower surface of the base of swivel 40. As can be seen in FIG. 9, the base of swivel 40 also includes a second hole which extends vertically through the front portion thereof, and a bushing 38f, of the same size as bushing 38a, is disposed within this second hole. The axis of bushing 38e is disposed intermediate arms 44a, 44b and intersects the axes of holes 46a, 46b in said arms and is substantially perpendicular thereto.

Still with reference to FIG. 9, the shank of a swivel pivot 48 passes through bushing 38e set in swivel 40, bushing 38a set in swivel support plate 24, and the hole 16 in top plate 14, said swivel pivot including an integral head 49 the width of which is greater than the diameter of the bushing 38e set in the centrally-located hole in swivel 40. A washer 50 is positioned on the shank of swivel pivot 48 at the upper surface of the base of swivel 40, and a nut 52 is threadedly engaged with the projecting lower end of said shank. The nut 52 is tightened to secure swivel 40 snugly against swivel support plate 24 while permitting it to rotate freely thereon.

As can best be seen in FIG. 7, a swivel locking device, generally designated by numeral 54, is mounted on the front portion of the base of swivel 40. This locking device comprises an upstanding L-shaped support member 56 fixedly secured to the base of swivel 40 by means of a machine screw 58 (shown in dotted outline in the drawing) and a lever 60 pivoted to said support member by means of a machine screw 62. At one end of lever 60 there is a slot in which is positioned the neck 64 of a plunger generally designated by numeral 66. The plunger 66 has a lower portion 68 of reduced diameter which is slidably disposed within the bushing 38f set in the base of swivel 40. In the position of swivel 40 illustrated in FIG. 7, the lower portion 68 of plunger 66 is also disposed within bushing 38c set in hole 36c in swivel support plate 24, thus locking swivel 40 so that the axes of holes 46a, 46b in its arms 44a, 44b are disposed perpendicular to the axis of slot 12b in top plate 14. A spring 70 is held between the outer end of lever 60 and the base of swivel 40 by means of two set screws 61a, 61b which respectively project from the lower surface of said lever and the upper surface of said base into the ends of said spring.

As can best be seen in FIG. 4, a stop 72a is fixedly mounted on the end of a stop support 74 that is fastened to the rear portion of the base of swivel 40 by means of two machine screws 76a, 76b. As illustrated in FIG. 1, the forward portion of the base of swivel 40 is provided with a self-sealing oil cup 78a that communicates with a vertical hole extending through said base.

Figure 8:
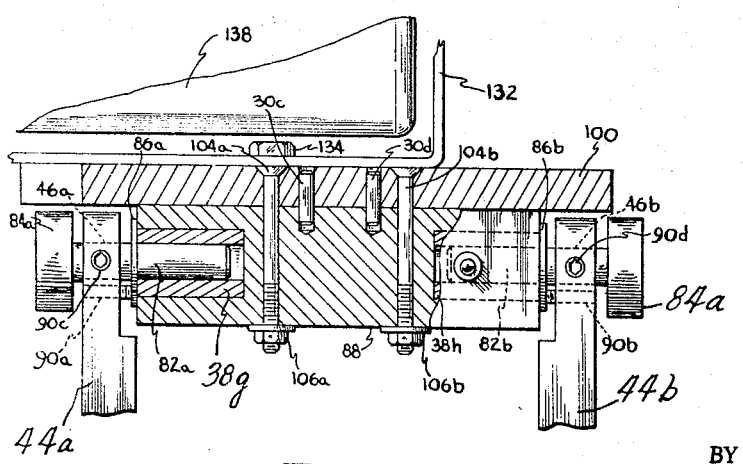

As can best be seen in FIG. 8, in each hole 46a, 46b in arms 44a, 44b is disposed a support pivot 82a, 82b which is provided with an integral knob 84a, 84b to facilitate its removal from the hole. Each of the support pivots 82a, 82b extends beyond the inside surface (i.e., the surface facing the center of the base of swivel 40) of the arm 44a, 44b in which it is mounted and through a washer 86a, 86b into a bushing 38g, 38h which is set in a hole formed in the end of a support bar 88. The diameter of each support pivot 82a, 82b is slightly less than the inside diameter of the bushing 38g, 38h in which it is positioned, so that the support bar 88 rotates freely about the support pivots. Each bushing 38g, 38h is of the same size as bushing 38a and projects from a respective end of the support 88, with a respective one of the washers 86a, 86b being positioned around this projecting portion of each bushing. In the preferred embodiment of the invention herein described the washers 86a, 86b are thicker than illustrated in FIG. 8, so that the washers almost completely fill the gaps between the ends of support bar 88 and arms 44a, 44b of the swivel 40, the drawing differing from actual construction of the preferred embodiment so as to more clearly show set screws 90a, 90b (both of which are illustrated partially in dotted outline in FIG. 8) which are respectively threadedly engaged within horizontally-disposed holes in arms 44a, 44b and which respectively contact washers 86a, 86b. Either or both of the set screws 90a, 90b can be turned toward or away from the washers 86a, 86b to adjust the play of support bar 88 between the arms 44a, 44b. Two other set screws 90c, 90d are also provided to lock support pivots 82a, 82b within the respective holes 46a, 46b in arms 44a, 44b. Holes (not shown) respectively extend from the front surface of support bar 88 to the holes in which bushings 38g, 38h are positioned, and self-sealing oil cups 78b, 78c (only 78c being illustrated in FIG. 8) are fixedly disposed in the outer end of said holes.

Four holes extend vertically through support bar 88, these holes being aligned linearly along said support bar. The two inside holes extend only partially through the support bar and have respectively fixedly mounted therein two alignment pins 30c, 30d the ends of which project above the upper surface of the support bar. A support arm 100 is connected to support bar 88 by means of two machine screws 104a, 104b which respectively extend through the outer two of the aforementioned four holes in support arm 88, each of said screws being provided with a nut 106a, 196b threadedly engaged with the projecting lower end thereof to secure said support arm 100 fixedly to said support bar 88. The upper portion of each alignment pin 30c, 30d fits snugly but slidably within a respective one of two holes which extend through support arm 100.

As illustrated in FIGS. 1 and 2 the ends of support arm 100 extend on opposite sides of support bar 88, and, as illustrated in FIG. 5, are offset from each other in a dog-leg configuration, i.e., said support arm 100 comprises offset end portions and an integral central portion which is obliquely disposed to said end portions. An arbor, generally designated by numeral 108 and provided with a rotatable shaft 110, is fixedly mounted on the upper surface of support arm 100 adjacent the front end thereof by means of two machine screws 112a, 112b which respectively extend through holes located at opposite ends of said arbor and mating holes formed in said support arm 100. A pulley 116 is fixedly mounted on one end of the shaft 110 of arbor 108. The other end of shaft 110 is provided with an integral shoulder 118 against the outer face of which is positioned a cutting blade 120. A washer 122 is positioned adjacent the cutting blade 120, and a nut 124, threadedly engaged with the shaft 110, is tightened against said washer sufficiently to lock the cutting blade fixedly against shoulder 118. The shoulder 118 is spaced from the end of shaft 110 so that when the lower portion 68 of plunger 66 is positioned within one of the bushings 38b, 38c, 38d set in swivel support plate 24, the cutting blade 120 is medially positioned above the corresponding slot 12a, 12b, 12c in top plate 14.

The lower end of an L-shaped handle 126 is threadedly engaged within a hole 128 (shown in dotted outline in FIG. 4) located adjacent the front end of support arm 100, a nut 130 being threadedly engaged with the lower end of said handle to lock it fixedly in the illustrated position. A motor support frame 132 is fixedly mounted on the other end of support arm 100 by means of a plurality of machine screws 134 which pass through holes in said frame and holes in said support arm and which are secured with nuts 136. An electric motor 138 is fixedly mounted between the arms of motor support frame 132, said motor having a drive shaft 140 on which is fixedly mounted a pulley 142, and a drive belt 144 operably connects this pulley to pulley 116.

Protection of an operator of the saw from accidental contact with the drive belt 144 or cutting blade 120 is effected by means of two guards 146 and 148. The drive belt guard 146 is fixedly positioned over the drive belt 144 by means of two machine screws 150a, 150b (see FIG. 5) which pass through holes located adjacent the lower edge of one side of said guard and which are threadedly engaged within holes formed in support arm 100. A portion of the lower edge of the other side of guard 146 rests upon the upper surface of support arm 100. This side of guard 146 includes two openings, illustrated by dotted lines in FIG. 4, that are respectively located adjacent arbor 108 and drive shaft 140. As can best be seen in FIG. 5, one side of the cutting blade guard 148 is pivotally mounted on a support block 154 by means of a machine screw 156 which extends through holes in the sides of said guard 148 and through a hole horizontally disposed in said support block 154 and which is provided with a nut 158. The support block 154 is itself fixedly secured to the upper surface of support arm 100 by means of two machine screws 160a, 160b that are positioned within holes vertically disposed in said support block and threadedly engaged within mating holes in said support arm 100. As illustrated in FIGS. 4 and 6, one leg of an L-shaped bracket 162 is fixedly mounted adjacent the front edge of guard 148 by means of a machine screw 164 threadedly engaged within a hole horizontally disposed in said guard. A hole 166 extends vertically through the projecting leg of bracket 162, and a wheel support post 168 is slidably positioned within this hole. A resilient wheel 170 is rotatably mounted upon the lower end of the wheel support post 168, the latter being held in a predetermined position within the hole 166 by means of a set screw 174. Thus the wheel support post 168 can be raised or lowered within the bracket 162 so as to change the height at which the lower edge of guard 148 will be positioned above the top plate 14 of worktable 12 when said wheel 170 is in contact with said top plate.

Again with reference to FIG. 5, one leg of a second L-shaped bracket 176 is fixedly secured to the other side of guard 148 by means of a machine screw 178. A stop 72b is fixedly mounted adjacent the end of the other leg of said bracket 176. Bracket 176 is located on guard 148 in such a position that stop 72b contacts arbor 108 when the forward end of support arm 100 is pivoted away from top plate 14 and cutting blade 120 moves upwardly into guard 148 to a position near, but not in contact with, the upper edge of said guard. The side of guard 148 to which bracket 176 is attached includes a V-shaped opening, illustrated by dotted lines in the drawing, which is located so that shaft 110 does not contact said guard when the latter is pivoted to provide maximal shielding of cutting blade 120. A rigid arm 179 is threadedly engaged within a hole vertically disposed in support arm 100 adjacent support block 154. This stop 179 can be adjusted with respect to its vertical position in support arm 100 so that it will contact the base 42 of swivel 40 when the forward end of support arm 100 has been pivoted a predetermined distance toward the worktable 10, thus enabling an operator of the saw to limit the depth which cutting blade 120 will reach in any one of the slots 12a, 12b, 12c.

As illustrated in FIG. 1, four L-shaped fence members 180a through 180d are fixedly secured to top plate 14 by means of a multiplicity of machine screws 182 and nuts 184, the latter being illustrated in other of the drawings. The fence members 180a through 180d are disposed in linear relation and are perpendicular to the axis of slot 12b, the ends of said fence members being coterminous with the edges of the respective slots 12a, 12b, 12c so that the cutting blade 120 can enter the portion of each slot located behind the front, vertically-disposed legs of said fence members. A removable workpiece positioner 186 is illustrated in one operable position upon top plate 14, said workpiece positioner comprising an elongated plate having recessed edges, designated in FIG. 1 by numerals 188a, 188b, adjacent each end thereof and including two medially located holes (not shown in FIG. 1) in which two machine screws 190a, 190b are respectively positioned. Each of the machine screws is provided with a nut 192a, 192b which is threadedly engaged with the projecting lower end thereof. The machine screws 190a, 190b respectively pass through holes in a plate member 193, and the nuts 192a, 192b are tightened to hold said plate member in slidable contact with the lower surface of top plate 14 adjacent the edges of slot 12b. The diameter of the shank of each machine screw 190a, 190b is only slightly less than the width of the slot 12b in top plate 14. A locking bolt, generally designated by numeral 194, extends through a third hole formed in the workpiece positioner 186, this bolt having a head 196 in contact with the lower surface of top plate 14 adjacent the edges of slot 12b. A wing nut 198, threadedly engaged with the projecting upper end of locking bolt 194, can be tightened against the upper surface of the workpiece positioner 186 to fixedly lock the latter against the upper surface of top plate 14 at a predetermined distance from the fence members 180a through 180d. The machine screws 190a, 190b and locking bolt 194 are spaced along a line disposed perpendicular to the edge of the workpiece positioner 186 that faces the fence members 180a through 180d; therefore, that edge is held parallel to the front, vertically-disposed legs of said fence members.

The weight of the electric motor 138 will cause the rear portion of support arm 100 to rest upon stop 72a when the saw is not in use. However, the effort required on the part of an operator to pivot the forward end of support arm 100 toward worktable 10 is reduced by means of a spring 200 (see FIG. 4) connected to said support arm and the base 42 of swivel 40.

Although the components of the above-described preferred embodiment of the present invention may consist of a great variety of well-known materials, it is preferable to employ aluminum alloys for the parts thereof that are not subject to great stress or wear, thus minimizing the weight of the saw and enhancing its portability. In the preferred embodiment aluminum alloys are therefore used in the construction of the components of the worktable 10, swivel 40, support bar 88, and support arm 100. All other structural components are made of steel, and stops 72a and 72b and wheel 170 are formed of rubber.

The above-described preferred embodiment of this invention can be used with particular advantage in mitering picture frame molding but is obviously not limited to such use. It will be recognized that an operator of the saw can cut a workpiece placed upon the wortable 10 over one of the slots 12a, 12b, 12c by pulling handle 126 downwardly to pivot the forward end of support arm 100 toward said worktable and thus bring cutting blade 120 into the slot. When cuts are to be made at 45 degrees or 90 degrees, support arm 100 will be locked at the desired cutting angle by means of the swivel locking device 54. As will be understood from study of the foregoing description of the preferred embodiment of the invention, bushings 38b, 38c, 38d are set in swivel support plate 24 so as to provide cutting angles of 45 degrees and 90 degrees with respect to the fence members 180a through 180d. To change the angle that the saw will cut a workpiece, an operator can depress the outer end (i.e., the end remote from plunger 66) of lever 60, causing the lever to pivot about screw 62 and lift the plunger 66 so that the lower portion 68 thereof is clear of the particular bushing 38b, 38c, 38d in which it is positioned. The handle 126 can then be used to turn support arm 100 (and swivel 40) about swivel pivot 48 to the desired cutting position, whereupon the lower portion 68 of plunger 66 (which may be permitted to slide upon support plate 24 after support arm 100 has been moved out of alignment with its previous cutting position) will drop into the particular bushing 38b, 38c, 38d at the selected cutting angle again locking support arm 100 fixedly with respect to worktable 10. It will be recognized that the chamfered upper edge of the bushings 38b, 38c, 38d will facilitate the movement of the lower portion 68 of plunger 66 into said bushings. It will also be appreciated that the construction of the swivel locking mechanism of the preferred embodiment of the present invention precludes the possibility of the support arm 100 being accidentally moved from any one of its three fixed operating positions because the plunger 66 is biased downwardly under the force exerted upon lever 60 by spring 70 and its lower portion 68 extends through the preselected bushing 38b, 38c, 38d to a point adjacent the lower edge thereof. Thus the plunger 66 must be lifted a distance almost equal to the length of a bushing 38b, 38c, 38d before support arm 100 can be moved laterally, and this vertical motion of plunger 66 can only be effected by positive action on the part of the operator.

As indicated above, the fence members 180a through 180d may be used alone to position workpieces upon top plate 14 for cutting. However, in cutting picture frame molding it is particularly advantageous to use the workpiece positioner 186 in combination with the fence members 180a through 180d. Heretofore saws used for cutting picture frame molding have been provided with only a single fence against which it is customary to place that edge of the molding which forms the inner edge of the assembled picture frame. Commercial picture frame molding generally has a rabbet adjacent this edge, in which the picture and backing material are placed. Commercial picture frame molding also generally has a flat surface on that part of the molding which forms the back of the picture frame after its assembly. This flat surface is, in the case of many molding shapes, limited in width because of the design of the molding, the shape of which is decided by esthetic considerations rather than by convenience in cutting. In FIG. 4 a picture frame molding of the type commonly employed in the construction of large picture frames is illustrated in cross-section between the fence members 180a through 180d and the workpiece positioner 186. In the ordinarily employed method of cutting such picture frame molding the position of the molding would be reversed upon worktable 10, with the edge which forms the inner edge of the assembled picture frame (i.e., the edge of the molding at the right in FIG. 4) being held against a fixed fence corresponding to fence members 180a through 180d while the molding is being mitered. However, because the inner edge of conventional picture frame molding is narrow (thus providing a relatively small area of contact between this portion of the molding and the fixed fence) and because the flat surface thereof which forms the back of the frame is also narrow (thus providing a relatively small area of contact between this portion of the molding and the surface of the worktable, as can be seen in FIG. 4 wherein this flat surface is illustrated resting upon top plate 14), the picture frame molding will often be positioned improperly on the worktable. More specifically, the picture frame molding will be allowed to tilt so that the flat surface thereof which forms the back of the frame is not held against the surface of the worktable. It will be recognized by those persons skilled in the art of picture frame fabrication that failure to keep the aforementioned flat surface of the picture frame molding against the surface of the worktable of the saw will cause the mitered end of the molding to be cut at an improper angle so that it cannot be properly joined with the mitered end of an adjacent member of the picture frame. The workpiece positioner 186 of the preferred embodiment of this invention obviates this difficulty because, as can be seen in FIG. 4, the rabbet adjacent the inner edge of the picture frame molding that is to be mitered is positioned against the rear edge of said workpiece positioner. To ensure accurate mitering of a piece of picture frame molding by use of the workpiece positioner 186, an operator of the preferred embodiment of the invention first places the molding with its flat back surface against the worktable 10 and then slides the molding back against the fence members 180a through 180d. The workpiece positioner is then moved toward said fence members so that it contacts the vertical (i.e., vertical when in the position illustrated in FIG. 4) surface of the rabbet adjacent the inner edge of the molding. Because the design of the workpiece positioner 186 is simple, it will be economically feasible to provide a set of such workpiece positioners having different thicknesses to conform to the depth of various rabbets commonly formed in picture frame molding. Therefore, a workpiece positioner 186 will be selected which has such thickness that the horizontal (i.e., horizontal when in the position illustrated in FIG. 4) surface of the aforementioned rabbet will be in contact with the workpiece positioner. The piece of picture frame molding that is to be mitered will then be held between the fence members 180a through 180d and the workpiece positioner 186 as illustrated in FIG. 4. It has been found that workpieces held as described above do not tilt as they are being cut, and consequently there is no waste of expensive picture frame molding because of improper mitering.

The construction of the above-described preferred embodiment of this invention provides several advantages not obtained in the design of some of the presently available pivotal-arm saws. For example, the preferred embodiment of the invention is relatively inexpensive to manufacture because there are only two castings utilized in its construction, namely, the swivel 40 and the arbor 108. All other structural components of the saw can be machined from conventional stock. Another advantage of the described preferred embodiment of this invention is achieved through the use of alignment pins to ensure that certain of its components can be conveniently replaced by unskilled persons without adversely affecting the cutting alignment of the saw. Thus if it becomes necessary to replace the workpiece 10, a manufacturer of the saw can supply another worktable which includes the alignment pins 30a, 30b fixedly set in the top plate 14 thereof, so that an unskilled person can readily mount the old swivel support plate 24, with the other components of the saw connected therewith, on the new worktable 10. Likewise, the support arm 100 of the saw can conveniently be replaced because of the alignment pins 30c, 30d fixedly set in support bar 88. The design of the preferred embodiment of this invention also provides a pivotal-arm saw having the capacity of cutting relatively wide workpieces, as the cutting blade 120 can enter any one of the slots 12a, 12b, 12c in the worktable 10 to a considerable depth without contacting a structural component of the saw, an advantage not obtained in some of the available pivotal-arm saws having structural members that limit the width and depth of cut that can be made.

The illustrated and described offset, or dog-leg, configuration of support arm 100 also provides maximal structural strength for this member with minimal weight and geometric complexity. Furthermore, this novel arrangement of the pivotal-arm of the saw also provides the advantage that the support arm 100 serves to shield the forward, lower portion of the drive belt 144 while the lower rear portion of said drive belt is accessible.

While this invention has been shown in but one form, it will be obvious to those skilled in the art that it is not so limited but is susceptible of various changes and modifications without departing from the spirit and scope of the claimed invention. For example, for certain uses of the saw the swivel support plate 24 may be removed and the base 42 of swivel 40 fixedly attached to the top plate 14 of worktable 10.

I claim:
1. A power saw comprising:
    a worktable;
    a swivel rotatably mounted on said worktable, said swivel including a base and at least one arm upstanding from said base, the axis of rotation of said swivel being disposed substantially perpendicular to said worktable;
    a support arm rotatably connected to said arm of said swivel, said support arm comprising an elongated plate having offset end portions and a central portion disposed oblique to said end portions, the axis of rotation of said support arm being disposed substantially parallel to said worktable;
    a drive motor fixedly mounted on said support arm adjacent one end thereof;
    a cutter rotatably mounted on said support arm adjacent the other end thereof; and
    drive means operably connected to said drive motor and cutter.
2. A power saw as defined in claim 1 wherein said axis of rotation of said swivel intersects said axis of rotation of said support arm.
3. A power saw as defined in claim 2 including:
    at least one fence member fixedly mounted on said worktable, said fence member having one surface thereof disposed perpendicular to said worktable;
    a workpiece positioner slidably mounted on said worktable, said workpiece positioner having one surface thereof disposed parallel to said surface of said fence member which is disposed perpendicular to said worktable; and
    means for fixedly locking said workpiece positioner at variable distances from said fence member.
4. A power saw comprising:
    a worktable having at least one slot formed therein;
    a swivel pivot connected to said worktable, the axis of said swivel pivot being disposed substantially perpendicular to the upper surface of said worktable;
    a swivel rotatably mounted on said swivel pivot, said swivel including a base and a pair of oppositely disposed arms upstanding from said base, each of said arms having a hole formed therein at the portion thereof remote from said base, the axis of each of said holes intersecting the axis of said swivel pivot and being disposed substantially parallel to the upper surface of said worktable;
    a support pivot disposed within each of said holes in said arms of said swivel;
    a support bar rotatably mounted between said arms of said swivel, the ends of said support bar being respectively connected to said support pivots;
    a suppport arm fixedly mounted on said support bar, said support arm comprising an elongated plate having offset end portions and a central portion which is disposed oblique to said end portions and which extends on opposite sides of said support bar;
    a motor fixedly mounted on said support arm adjacent one end thereof;
    a cutter rotatably mounted on said support arm adjacent the other end thereof; and
    drive means operably connected to said drive motor and cutter.
5. A power saw as defined in claim 4 including a swivel support plate disposed between said worktable and said base of said swivel.
6. A power saw as defined in claim 5 including at least one alignment pin fixedly mounted on said worktable and projecting from the upper surface thereof, and wherein said swivel support plate is provided with a hole in which the projecting end of said alignment pin is removably positioned.
7. A power saw as defined in claim 6 including at least one alignment pin fixedly mounted on said support bar and projecting from the upper surface thereof, and wherein said support arm is provided with a hole in which the projecting end of said alignment pin is removably positioned.
8. A power saw as defined in claim 6 including means for locking said swivel in selected angular position on said swivel support plate.
9. A power saw as defined in claim 6 including:
    a bushing disposed between said swivel pivot and said base of said swivel; and
    a pair of bushings each respectively disposed between one of said support pivots and said support bar.

References Cited
UNITED STATES PATENTS

| | | | |
|---|---|---|---|
| 2,851,068 | 9/1958 | Goodlet | 143—46 X |
| 2,856,973 | 10/1958 | Horton | 143—46 X |
| 3,105,528 | 10/1963 | Lougnridge | 143—46 X |
| 3,139,124 | 6/1964 | Hoff | 143—46 X |
| 3,275,044 | 9/1966 | Kisling | 143—6 |

WILLIAM W. DYER, JR., *Primary Examiner.*

W. D. BRAY, *Assistant Examiner.*